(12) United States Patent
Iwanami et al.

(10) Patent No.: US 6,986,645 B2
(45) Date of Patent: Jan. 17, 2006

(54) HYBRID COMPRESSOR WITH A SELECTIVE DRIVE CLUTCH MEANS AND SPEED INCREASING MEANS FOR DRIVING THE COMPRESSOR AT HIGHER SPEEDS WITH AN ENGINE AT HIGH LOAD REGIONS

(75) Inventors: Shigeki Iwanami, Okazaki (JP); Keiichi Uno, Kariya (JP); Yasushi Suzuki, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/310,028

(22) Filed: Dec. 5, 2002

(65) Prior Publication Data

US 2003/0118450 A1 Jun. 26, 2003

(30) Foreign Application Priority Data

Dec. 26, 2001 (JP) .................................... 2001-394690
Jul. 4, 2002 (JP) .................................... 2002-196054

(51) Int. Cl.
 F04B 49/20 (2006.01)

(52) U.S. Cl. ............................ 417/16; 417/223; 417/42; 417/364; 417/374; 62/236

(58) Field of Classification Search ................ 417/42, 417/223, 16, 374, 362, 364, 423.6; 62/323.1, 62/236
See application file for complete search history.

(56) References Cited

U.S. PATENT DOCUMENTS

| | | | | |
|---|---|---|---|---|
| 3,734,637 A | * | 5/1973 | Beck, Jr. ................ | 415/122.1 |
| 5,197,860 A | * | 3/1993 | Nishida et al. .............. | 417/34 |
| 5,867,996 A | * | 2/1999 | Takano et al. ............... | 62/175 |
| 6,199,391 B1 | * | 3/2001 | Link et al. ................... | 62/133 |
| 6,217,297 B1 | | 4/2001 | Tsumagari et al. | |
| 6,234,769 B1 | | 5/2001 | Sakai et al. | |
| 6,287,081 B1 | * | 9/2001 | Tamegai et al. ............. | 417/15 |
| 6,375,436 B1 | * | 4/2002 | Irie et al. .................... | 417/223 |
| 6,443,712 B2 | | 9/2002 | Sakai et al. | |
| 6,638,027 B2 | * | 10/2003 | Mohrmann ................. | 417/223 |
| 6,659,727 B2 | * | 12/2003 | Major et al. ................. | 417/16 |
| 2002/0067999 A1 | * | 6/2002 | Suitou et al. ............... | 417/374 |
| 2002/0078700 A1 | * | 6/2002 | Kelm et al. .................. | 62/236 |
| 2003/0091444 A1 | * | 5/2003 | Kelm et al. ................. | 417/212 |
| 2003/0108434 A1 | * | 6/2003 | Mohrmann ................. | 417/223 |
| 2003/0116368 A1 | * | 6/2003 | Winkelman et al. ....... | 180/65.2 |

FOREIGN PATENT DOCUMENTS

CN 1031055 2/1989

* cited by examiner

*Primary Examiner*—Charles G. Freay
*Assistant Examiner*—Emmanuel Sayoc
(74) *Attorney, Agent, or Firm*—Posz Law Group, PLC

(57) ABSTRACT

A hybrid compressor system affords maximum cooling capability by making full use of an additional motor to improve the fuel consumption efficiency of a vehicle while ensuring passenger compartment cooling when the engine is stopped. The hybrid compressor system includes a compression unit for compressing a refrigerant, a motor for driving the compression unit, and disconnection means for disconnecting the drive force of a vehicle engine. In the hybrid compressor system, when the thermal load of the refrigeration cycle system lies within a predetermined range in a higher load region, the control means connects the disconnection means to allow the vehicle engine to drive the compression unit. When the thermal load of the refrigeration cycle system lies within a lower load region of the predetermined range, the control means disconnects the disconnection means to allow the motor to drive the compression unit even while the vehicle engine is running.

18 Claims, 7 Drawing Sheets

FIG. 6A VEHICLE SPEED

FIG. 6B ENGINE ROTATION SPEED

FIG. 6C COMPRESSION UNIT ROTATION SPEED

FIG. 6D CLUTCH

FIG. 6E MOTOR ROTATION SPEED

FIG. 10

HYBRID COMPRESSOR WITH A SELECTIVE DRIVE CLUTCH MEANS AND SPEED INCREASING MEANS FOR DRIVING THE COMPRESSOR AT HIGHER SPEEDS WITH AN ENGINE AT HIGH LOAD REGIONS

CROSS REFERENCE TO RELATED APPLICATION

This application is based on, claims the benefit of priority of, and incorporates by reference the contents of prior Japanese Patent Applications No. 2001-394690 filed Dec. 26, 2001, and No. 2002-196054 filed Jul. 4, 2002.

BACKGROUND OF THE INVENTION

1. Field of the Invention

The present invention relates to a hybrid compressor system for a refrigeration cycle system mounted in a hybrid vehicle or an idle-stop vehicle which is designed not to idle for long periods of time.

2. Description of the Related Art

Generally, hybrid or idle-stop vehicles are commercially available to address the increasing need for fuel efficient vehicles which is intended to decrease the overall consumption of fuel. In these vehicles, the engine is adapted to stop in some running states (e.g., during rest stops for the idle-stop vehicle while, and for the hybrid vehicle, during rest stops, running at low speeds, and during starts or initial vehicle motion). The engine stopping causes the compression unit in a refrigeration cycle system, which is driven by the engine, to stop which ceases to provide air conditioning for the passenger compartment.

To address this problem, for example, there is disclosed in Japanese Patent Laid-Open Publication No. 2000-130323, a hybrid compressor in which rotation of the engine causes a pulley and a compression unit to be coupled to each other via an electromagnetic clutch with a rotating shaft of the compression unit opposite to the pulley being coupled with a motor. With this configuration, the motor can drive the compression unit when the electromagnetic clutch is turned OFF when the engine is stopped. This permits the refrigeration cycle system to operate even when the engine is stopped, thereby providing cooling for the vehicle.

However, considering the technique disclosed in the patent mentioned above, suppose the motor is to be responsible for the operation of the compression unit so as to achieve the maximum cooling capacity required of the refrigeration cycle system when the engine is stopped. In this case, it is necessary to provide both a motor and an external power supply of increased size, though it is only practical to employ a motor of a moderate size in consideration of ease of mounting the motor and all associated costs. This also requires the engine to run when cooling is lacking, which results in diminished fuel economy compared to what was originally expected.

Furthermore, the technique of the patent publication mentioned above is adapted to allow the motor to drive the compression unit only when the engine is stopped. Accordingly, this additional motor is not intended for use in response to all possible conditions of the vehicle, thereby causing the problems identified below to remain unsolved.

For instance, while the engine is running, variations in the rotation speed of the engine cause the compression unit to vary in operation, resulting in an unstable flow of the refrigerant. This degrades the efficiency of the refrigeration cycle system. Of greater concern is that this can lead to degradation of the fuel efficiency of the engine, as well as deterioration of the vehicle compartment environment which includes vibration and noise developed in the passenger compartment arising from the operational variations of the compression unit and the engine.

It is possible to alleviate the reduced efficiency of the refrigeration cycle system, due to variations in the rotational speed of the engine, by employing a variable volumetric capacity type compression unit to adjust the amount of discharge. However, this would make the compression unit itself expensive and cause a drop in the efficiency of the compression unit when it is operated at a reduced capacity of its variable volumetric capacity, thereby resulting in a degradation of the fuel economy of the engine.

On the other hand, a motor-driven compression unit is also known that does not need to be driven by an engine (e.g., Japanese Patent Laid-Open Publication No. Hei 11-159338). Arguably, the motor-driven compression unit makes it possible to avoid the influence exerted by variations in the rotational speed of the engine during operation. However, this motor-driven compression unit requires the motor to be sized in consideration of the maximum cooling capacity (as mentioned above) of the compression unit, thereby making it necessary to increase the sizes of both the motor and the external power supply.

SUMMARY OF THE INVENTION

In view of the aforementioned problems, it is an object of the invention to provide a hybrid compressor system that provides maximum cooling by using a small supplemental motor to drive the compressor and reduce fuel consumption of the vehicle while providing adequate air conditioning when the engine is stopped. To achieve the object, the present invention employs the following technical means.

According to a first aspect of the present invention, a hybrid compressor system includes: a compression unit (140) for compressing a refrigerant in a refrigeration cycle system (200), a motor (130) that rotates due to power supplied by a power source (20) that drives the compression unit (140), disconnection means (120) for disconnecting a drive force of a vehicle engine (10) transmitted to the compression unit (140), and control means (150) for providing control to operate the motor (130) and to allow the disconnection means (120) to perform disconnection. In the hybrid compressor system, when a thermal load of the refrigeration cycle system (200) lies within a predetermined range in a higher load region, the control means (150) connects the disconnection means (120) to allow the vehicle engine (10) to drive the compression unit (140). Alternatively, when the thermal load of the refrigeration cycle system (200) lies within a lower load region compared to the predetermined range, the control means (150) disconnects the disconnection means (120) to allow the motor (130) to drive the compression unit (140) even while the vehicle engine (10) is running.

This feature allows the primary drive force of the vehicle engine (10) to be employed to drive the compression unit (140) in order to use the compression unit to its maximum capacity. The fullest capabilities of the compression unit are necessary when the thermal load of the refrigeration cycle system (200) falls within a predetermined range on or toward the higher load region such as during the cooling operation of the vehicle.

When the passenger compartment has been cooled to reduce the thermal load on the refrigeration cycle system (200) to a lower load region of the predetermined range, since reduced operation is required of the compression unit (140), the motor (130) can be sized according to the capacity of the compression unit (140). That is, the motor (130) does not need to be sized in consideration of the maximum thermal load and thereby can be reduced in size together with the power source (20).

Additionally, the motor (130) may drive the compression unit (140) even while the engine (10) is running. This eliminates variations in operation of the compression unit (140) accompanied by variations in the rotation speed of the engine (10). This combined effort makes it possible to provide improved efficiency to the refrigeration cycle system (200). Typically, throughout a year, the thermal load occurs in the lower load region 80 to 90% of the time. This 80 to 90% usually excludes cooling operations during the summer. This allows the increase in the efficiency of the refrigeration cycle system (200) to greatly contribute to the improvement in fuel efficiency of the engine (10).

Furthermore, the motor (130) drives the compression unit (140), while the disconnection means (120) remains disconnected. This is accomplished without vibrations caused by the compression unit (140) being propagated to the vehicle engine (10) via the belt (50). This makes it possible to improve the ride or sensation that a passenger feels in the passenger compartment with regard to vibration and noise.

Additionally, when the vehicle engine (10) is stopped, the motor (130) can also serve as a power source, as in the prior art, to drive the compression unit (140), thereby continuing the cooling operation.

In this manner, the power sources for the compression unit (140), that is, the vehicle engine (10) and the motor (130), are alternatively used depending on the operating condition of the vehicle engine (10) and the thermal load on the refrigeration cycle system (200), that is, the amount of vehicle compartment cooling required. This makes it possible to cooling with a small motor (130) and provide improved fuel efficiency to the vehicle. Additionally, cooling the vehicle compartment is possible when the vehicle engine (10) is stopped.

According to a second aspect of the invention, the boundary between the higher load region (high cooling requirement) and the lower load region (low cooling requirement), with regard to the thermal load, is delineated by the half power position of the compression unit (140). In other words, when the compression unit (140) is set at one-half of its cooling capacity or higher, the compression unit is functioning in a higher load region or in a region of high cooling requirement. This high cooling requirement region corresponds to a maximum thermal load cooling capacity. When the compression unit (140) is set below one-half of its cooling capacity, the compression unit is functioning in a lower load region or in a region of low cooling requirement.

In general, since the coefficient of performance of the refrigeration cycle system (200) (the ratio of the amount of cooling corresponding to a thermal load to the power of the compression unit) decreases as the thermal load increases, the ratio of the increase in power required of the compression unit (140) to the thermal load increases. Conversely, only a slight decrease in thermal load reduces a great deal of power required of the compression unit (140). In this case, since the thermal load corresponding to less than or equal to half the maximum power is typically equal to 60 to 70% of the maximum thermal load, which is within the region corresponding to the normal to lower load on the refrigeration cycle system (200), the compression unit (140) can be operated without difficulty.

According to a third aspect of the invention, the cooling capacity at the maximum thermal load is capable of keeping a passenger compartment at a comfortable temperature during normal running of a vehicle when the vehicle is subjected to the direct rays of the summer sun.

According to a fourth aspect of the invention, the control means (150) includes an inverter (151) for inverting power supplied to the motor (130). The invention is adapted such that the motor (130) and the inverter (151) are set at a particular capacity, as a maximum output, for delivering the power of the compression unit (140) required in the boundary region of the higher load region and the lower load region of the thermal load. This allows the motor (130) and the inverter (151) to be provided with the lowest amount of power but yet the necessary capability to meet the operating power of the compression unit (140) in the lower load region while the motor (130) maintains its small size.

According to a fifth aspect of the invention, the compression unit (140) is a compression unit of a fixed volumetric capacity type having a discharge volume per one revolution set to a predetermined value (V1). To allow the motor (130) to drive the compression unit (140), the control means (150) varies a rotation speed of the motor (130) to control an amount of discharge from the compression unit (140).

This allows the rotation speed of the motor (130) to vary the amount of discharge from the compression unit (140) thereby eliminating the necessity of the compression unit (140) itself to be provided with a function for varying the amount of discharge. This makes it possible to manufacture the compression unit (140) at a low cost. Unlike those of a variable volumetric capacity type, the compression unit (140) of a fixed volumetric capacity type is not significantly reduced in efficiency at the time of a small amount of discharge and thus can always be used with high efficiencies under optimum conditions. This makes it possible to provide improved fuel consumption efficiency to the vehicle.

According to a sixth aspect of the invention, an external drive means (110) driven by the vehicle engine (10) is provided on a side of the disconnection means (120) close to the vehicle engine (10). A speed increasing means (170) for increasing a rotation speed of the drive force transmitted from the vehicle engine (10) is provided between the external drive means (110) and the compression unit (140) but not between the motor (130) and the compression unit (140). The compression unit (140) is increased in speed by the speed increasing means (170) when the compression unit (140) is driven by the vehicle engine (10). The compression unit (140) is in sync with the rotation speed of the motor (130) when the compression unit (140) is driven by the motor (130).

This configuration allows the rotation speed to serve to provide the maximum amount of discharge required to operate the compression unit (140) driven by the vehicle engine (10). This in turn allows the compression unit (140) to provide a smaller discharge volume per revolution, thereby realizing the compression unit (140) at a reduced size and manufactured at a lower cost.

According to a seventh aspect of the invention, the hybrid compressor system further includes rotation speed sensor means (40) for sensing a rotation speed of the vehicle engine (10) or the compression unit (140). When the compression unit (140) is driven by the vehicle engine (10) and a rotation speed sensed by the rotation speed sensor means (40) is determined to be greater than or equal to a predetermined rotation speed (Ns1), the control means (150) disconnects the disconnection means (120) or disconnects the disconnection means (120) to allow the motor (130) to drive the compression unit (140). Alternatively, when the rotation speed is below the predetermined rotation speed (Ns1), the control means (150) connects the disconnection means (120) or connects the disconnection means (120) to stop the motor (130).

In the case where the compression unit (140) is driven at a high rotation speed to meet the amount of discharge required as described with reference to the sixth aspect of the invention, there is a limiting rotation speed associated with the durability of the compression unit (140). Therefore, the disconnection means (120) is disconnected to protect the compression unit (140) when the predetermined rotation speed Ns1 or more is reached. At a lower rotation speed of the vehicle engine (10), the compression unit (140) is driven again, ensuring no chance of significantly impairing the performance of the refrigeration cycle system (200). Additionally, the motor (130) adapted to drive the compression unit (140) while the disconnection means (120) remains disconnected would make it possible to substantially maintain the performance of the refrigeration cycle system (200).

According to an eighth aspect of the invention, the disconnection means (120) is preferably an electromagnetic clutch (120). According to a ninth aspect of the invention, when the thermal load on the refrigeration cycle system (200) lies within the predetermined range in the higher load region, the control means (150) connects the disconnection means (120) to allow the vehicle engine (10) and the motor (130) to drive the compression unit (140).

This allows the compression unit (140) to be driven by the motor (130) in addition to the vehicle engine (10), thereby making it possible to increase the amount of discharge and reduce the size of the compression unit (140) by that amount.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

(First Embodiment)

Now, a specific configuration according to a first embodiment of the present invention generally shown in FIGS. 1 to 8 will be explained below with reference to FIGS. 1 to 4.

Figure 1:
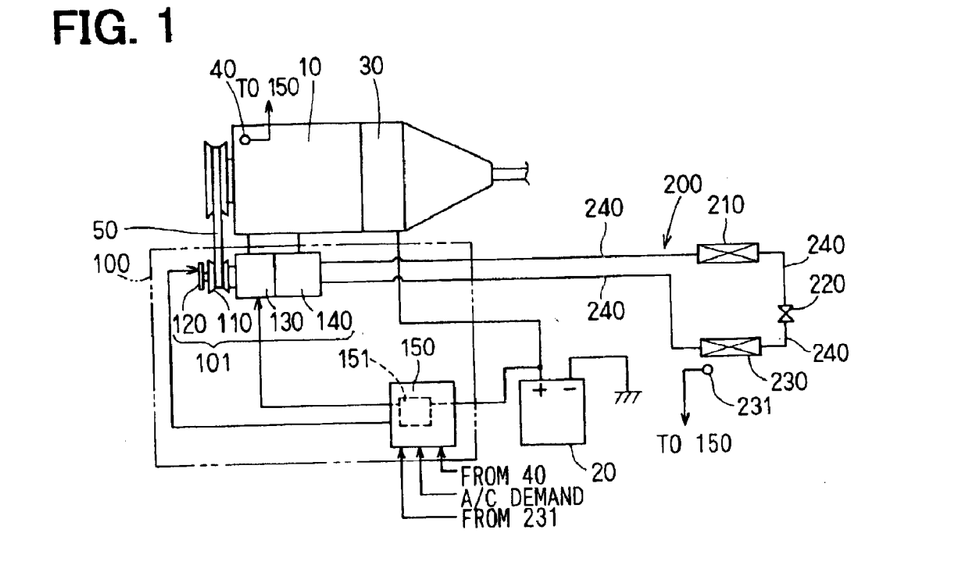
FIG. 1 is a schematic view of a configuration of a refrigeration cycle system incorporated into a hybrid vehicle according to a first embodiment of the present invention.

As shown in FIG. 1, a hybrid compressor system 100 is applied to a refrigeration cycle system 200 incorporated into a hybrid vehicle in which the vehicle engine (hereinafter referred to as the engine) 10 is shut down according to its running conditions. The hybrid compressor system 100 includes a hybrid compressor 101 and a controller 150 serving as control means. Additionally, the hybrid vehicle has a motor generator (an electric generator) 30 connected directly to the engine 10, which is provided with a rotation speed sensor 40 for sensing the rotation speed of the engine 10.

The refrigeration cycle system 200 provides for known refrigeration cycles and is provided with a compression unit 140, which is described later, which constitutes the hybrid compressor 101. The compression unit 140 compresses a refrigerant contained in the refrigeration cycle to high temperatures and high pressures. Refrigerant piping 240 is provided for sequentially connecting, in a closed loop, a condenser 210 for condensedly liquefying the compressed refrigerant, an expansion valve 220 for adiabatically expanding the liquefied refrigerant, and an evaporator 230 for evaporating the expanded refrigerant and cooling air passing therethrough by means of the latent heat resulting from the evaporation.

Upstream in the airflow from the evaporator 230, there is an evaporator temperature sensor 231 for sensing the temperature of incoming air (or alternatively the temperature of outside air). In this embodiment, the difference between the incoming air temperature and a target temperature determined by the outside air temperature is multiplied by the airflow rate to define the necessary cooling that corresponds to a thermal load on the refrigeration cycle system 200. The greater the difference between the incoming air temperature and the target temperature and the higher the flow rate of air to be cooled, the higher the necessary cooling (thermal load) of the refrigeration cycle system 200 becomes.

The necessary cooling at the maximum thermal load is defined as the cooling necessary to keep the passenger compartment at a comfortable temperature during normal operation under direct sunlight in the summer, a so-called cooling-down capability in the summer. More specifically, on a cloudless day with an outside-air temperature of 35 to 40° C., the cooling system is expected to be capable of keeping the passenger compartment at about 25° C. under normal running conditions corresponding to the 10.15 mode (at 40 to 60 km/h). Throughout a given year, the maximum thermal load occurs only at a frequency of 10 to 20%, while a middle to low level of thermal load occurs during the balance of the year (with frequencies of 80 to 90%).

The hybrid compressor 101 mainly consists of a pulley 110, an electromagnetic clutch 120, a motor 130, and compression unit 140. The configuration is explained more specifically with reference to FIG. 2. The pulley 110 serving as an external drive means has at its center portion a pulley rotating shaft 112 that is rotatably supported by a pulley bearing 111 installed in a motor housing 131. With this configuration the engine 10 turns a pulley 110 using a belt 50 (see FIG. 1). The pulley rotating shaft 112 is supported by means of a bearing 113.

Figure 2:
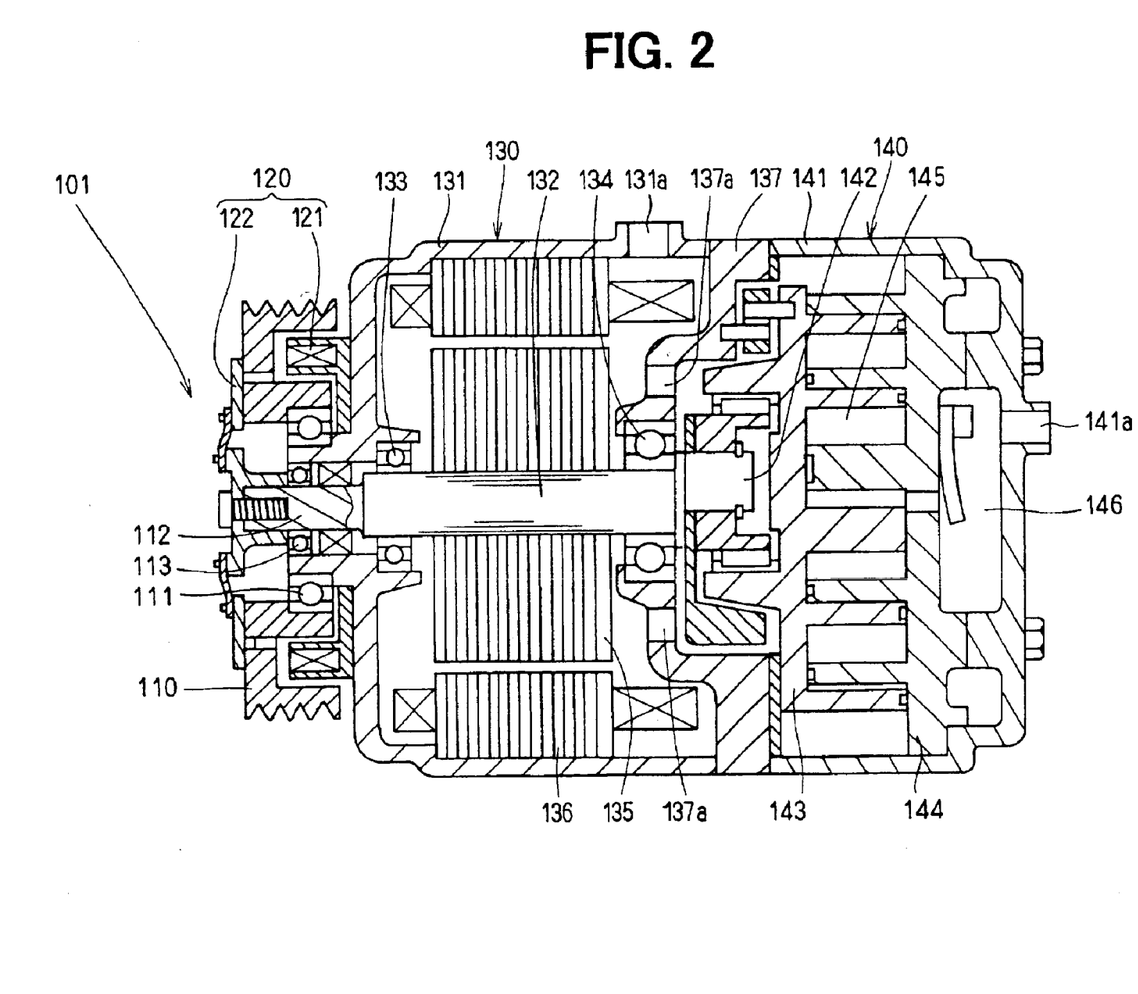
FIG. 2 is a cross-sectional view of the hybrid compressor of FIG. 1.

The electromagnetic clutch 120, serving as a disconnection means, disconnects the drive force of the engine 10 transmitted to the compression unit 140, to be described later, and includes a coil 121 secured to the motor housing 131 and a hub 122 connected to the pulley rotating shaft 112. As is known, the electromagnetic clutch 120 transmits the drive force from the engine 10 to the pulley rotating shaft 112 when the coil 121 is energized which attracts and engages the hub 122 with the pulley 110 (clutch ON). To the contrary, when the coil 121 is de-energized, the hub 122 moves away from the pulley 110 and disengages the drive force from the engine 10 (clutch OFF).

The motor 130 is an electric, alternating current (A/C) three-phase motor and includes a stator portion 136, secured to the inner circumferential surface of the motor housing 131, with a winding provided thereon, and a rotor portion 135 secured to a motor rotating shaft 132. The motor rotating shaft 132 is rotatably supported by means of a motor bearing 133 installed at the bottom portion of the motor housing 131 and a motor bearing 134 installed in a partition plate 137. The motor rotating shaft 132 is coupled to the pulley rotating shaft 112 mentioned above. Power supplied by a battery 20 (see FIG. 1) which serves as a power supply to the stator portion 136 via an inverter 151 causes the rotor portion 135 and the motor rotating shaft 132 to be rotatively driven.

Furthermore, in this embodiment, the compression unit 140 is a fixed volumetric capacity compression unit for providing a predetermined discharge volume (VI) per one revolution, or more specifically, a well-known scroll compression unit. The compression unit 140 includes a stationary scroll 144 secured to a compression unit housing 141, and a movable scroll 143 that revolves eccentrically by means of an eccentric shaft (drive shaft) 142 coupled to the aforementioned motor rotating shaft 132. The refrigerant is introduced through an inlet port 131a provided on the motor housing 131 and passes through a communication hole 137a provided on the partition plate 137. The refrigerant is then compressed in a compression chamber 145 and discharged from a discharge port 141a provided on the compression unit housing 141 via a discharge chamber 146. In this regard, the introduced refrigerant is brought into contact with the inside of the motor 130, thereby cooling the motor 130 to provide improved durability to the motor 130.

With reference to FIG. 1, the controller 150 receives a rotation speed signal on the engine 10 from the rotation speed sensor 40, an A/C demand signal, a temperature signal from the evaporator temperature sensor 231 and the like. In accordance with these signals, the controller 150 determines the thermal load on the refrigeration cycle system 200 in order to control the disconnection (disengagement) of the aforementioned electromagnetic clutch 120 and the operation of the motor 130.

More specifically, the controller 150 connects the electromagnetic clutch 120 for the cooling operation in which the thermal load on the refrigeration cycle system 200 falls within a predetermined range in its higher load region during the summer. Alternatively, suppose that the thermal load on the refrigeration cycle system 200 lies in a lower load region than the aforementioned range, for example, mainly during normal running after the cooling operation or during stoppage of the engine 10. In this case, even when the engine 10 is running, the controller 150 disengages the electromagnetic clutch 120. When the electromagnetic clutch 120 has been disengaged, the power from the battery 20 is varied by the internal inverter 151 in response to the thermal load on the refrigeration cycle system 200 at that time in order to drive the motor 130, while varying the operating rotational speed thereof, by the drive force of which the compression unit 140 is driven. The inverter 151 is a known AC/DC converter for converting the direct current from the battery 20 into an alternating current and adjusting the output current to the motor 130 by six internal switching elements being turned ON or OFF.

Figure 3:
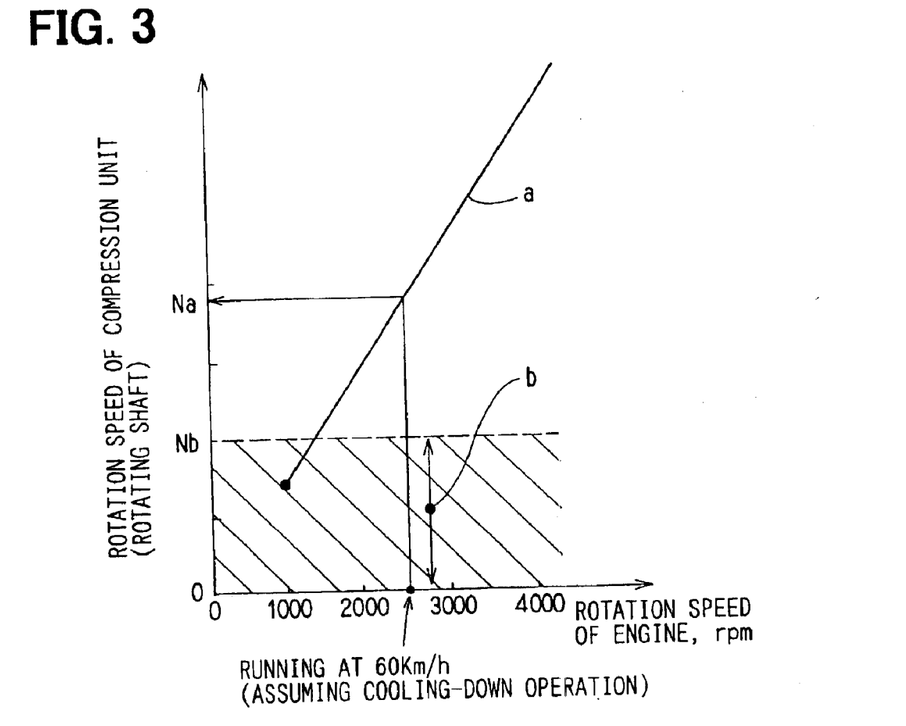
FIG. 3 is a graph showing the relationship between the engine rotation speed and the rotation speed of a compression unit.

In this embodiment, the specifications of the motor 130 and the compression unit 140 are determined in accordance with the rotational speed characteristic diagram shown in FIG. 3. FIG. 3 shows the rotation speed of the compression unit 140 against that of the engine 10. In FIG. 3, the rotation speed of the compression unit 140 is represented by line "a," depending on the pulley ratio, for the compression unit 140 operated by the drive force of the engine 10. Assume that a vehicle running condition (the rotation speed of the engine) for the cooling operation at which the refrigeration cycle system 200 is subjected to the maximum thermal load and let the maximum required rotation speed of the compression unit 140 be Na. The discharge volume per one revolution of the compression unit 140 (a predetermined value) V1 is determined in accordance with the amount of discharge V required at that time through the inverse operation of the relationship V=V1×Na.

Since the motor 130 does not drive the compression unit 140 at the time of the cooling operation, the motor 130 is permitted to operate within the range of a rotation speed Nb (indicated by "b" in FIG. 3) which is about half the aforementioned maximum required rotation speed Na. This reduces the motor 130 in size.

Figure 4:
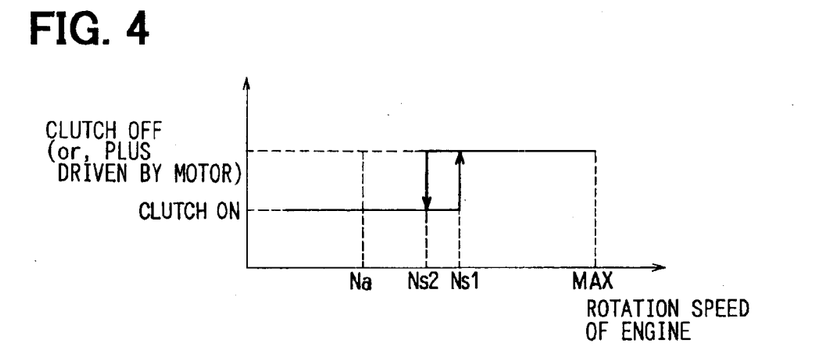
FIG. 4 is a graph showing ON and OFF control of an electromagnetic clutch with respect to the engine rotation speed.

Furthermore, in this embodiment, as shown in FIG. 4, suppose that the compression unit 140 is driven with the engine 10 at a higher rotation speed than is necessary. In this case, the electromagnetic clutch 120 is disconnected to protect the compression unit 140 when the engine rotation speed has reached the predetermined rotation speed Ns1 or more. To the contrary, when the engine rotation speed falls below a rotation speed Ns2 that is set at a lower side than the predetermined rotation speed Ns1, the electromagnetic clutch 120 is connected again to drive the compression unit 140. At the same time, while the electromagnetic clutch 120 is disconnected, the motor 130 drives the compression unit 140 to maintain cooling as much as possible.

Figure 5:
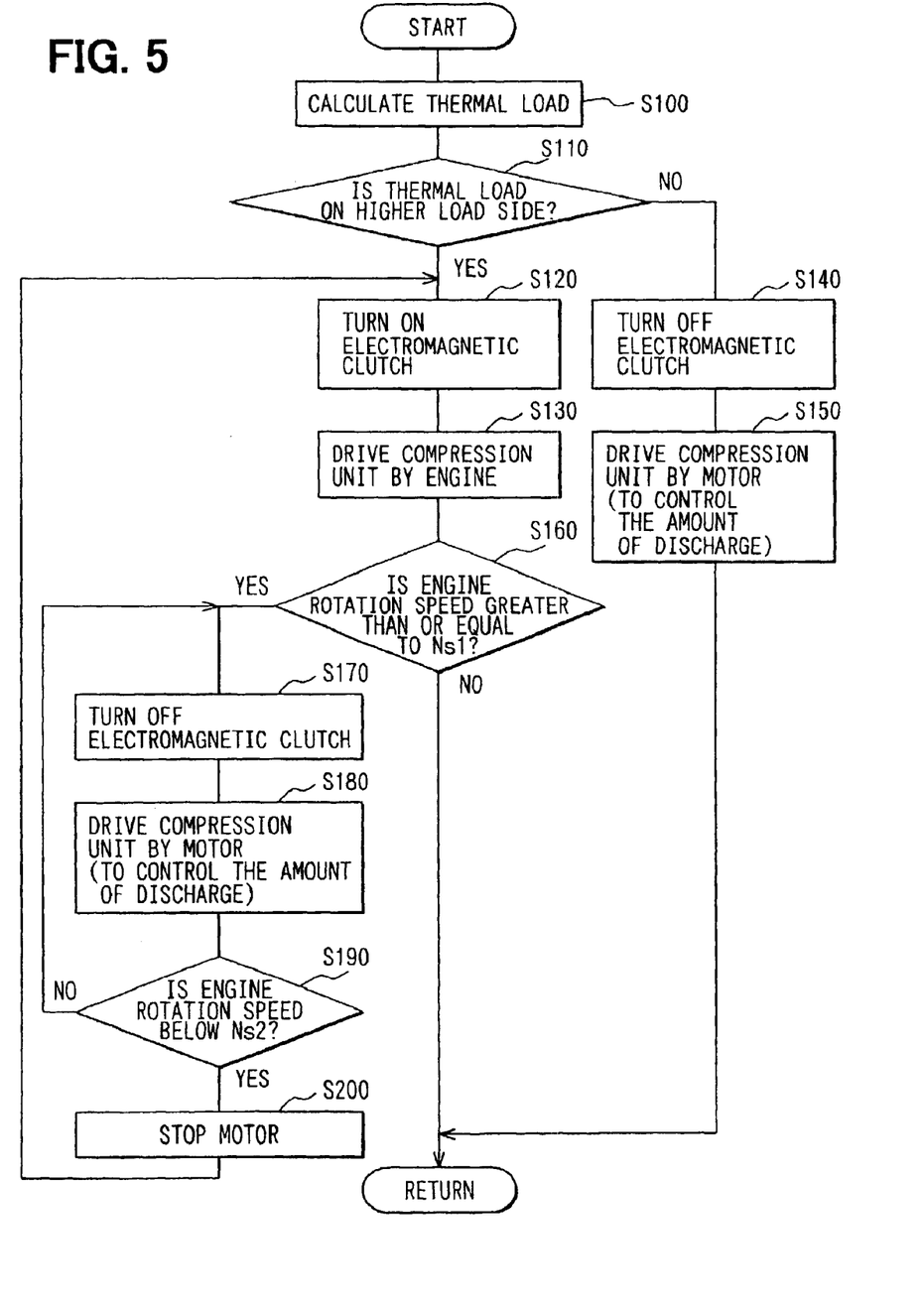
FIG. 5 is a flowchart showing the operation control according to the first embodiment.
Figure 6A:
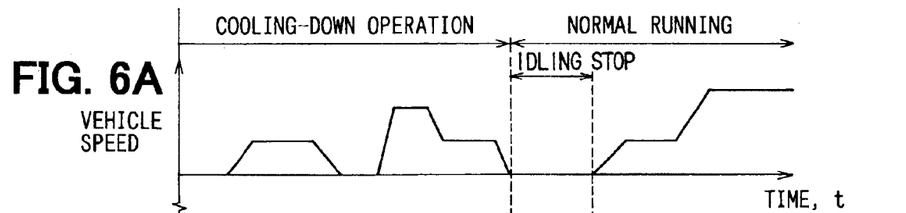
FIG. 6A is a graph showing vehicle speed versus time.
Figure 6B:
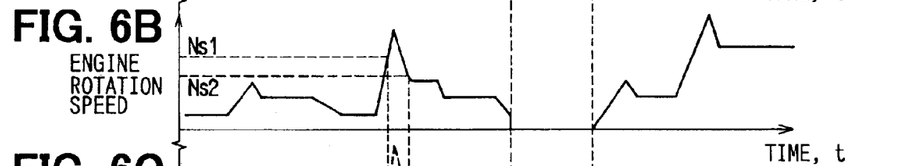
FIG. 6B is a graph showing the engine rotation speed versus time.
Figures 6C, 6D:
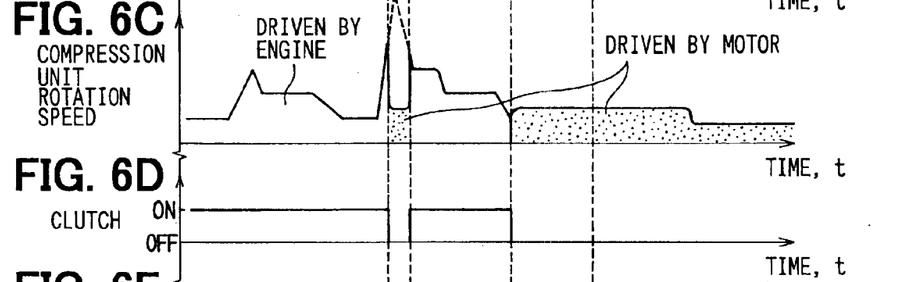
FIG. 6C is a graph showing the rotation speed of the compression unit versus time.
FIG. 6D is a graph showing the operation condition of the electromagnetic clutch versus time.
Figure 6E:
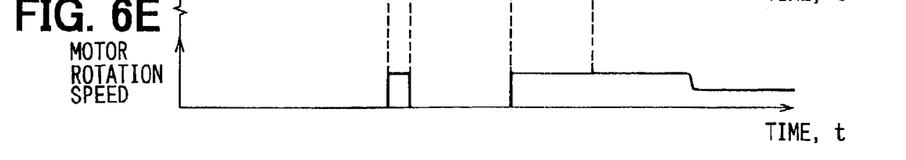
FIG. 6E is a graph showing the motor rotation speed versus time.

Now, the operation of this embodiment according to the aforementioned configuration will be explained below with reference to the flowchart shown in FIG. 5 and the time chart shown in FIG. 6. In FIG. 5, first, in step S100, the thermal load on the refrigeration cycle system 200 (or the corresponding cooling capability) is calculated in accordance with the incoming air temperature from the evaporator temperature sensor 231, the target temperature, and the airflow rate in the A/C demand signal.

Then, in step S110, if the thermal load falls within the predetermined range in the higher load region as in the cooling-down operation, the electromagnetic clutch 120 is connected in step S120, and then the engine 10 drives the compression unit 140 in step S130.

If the determination is "no" in step S110, that is, if the thermal load is at a lower region than the predetermined range (or if the cooling operation has cooled down the passenger compartment to reduce the thermal load on the refrigeration cycle system 200 to one for normal running conditions), the electromagnetic clutch 120 is disconnected in step S140 and then the motor 130 begins to drive the compression unit 140 even when the engine 10 is running. In this case, the rotation speed of the motor 130 varies within the range of the rotation speed Nb depending on the thermal load at that time to change the amount of discharge from the compression unit 140. Meanwhile, the electromagnetic clutch 120 remains disconnected.

While the engine 10 is driving the compression unit 140 in the aforementioned step S130, it is determined in step S160 whether the rotation speed of the engine is greater than or equal to the predetermined rotation speed Ns1. For example, suppose that the engine is required to run at a greater rotation speed than normally expected such as in the case of climbing a hill or at a rotation speed greater than or equal to the predetermined rotation speed Ns1. In this case, the electromagnetic clutch 120 is disconnected in step S170, and then, in step S180, the motor 130 begins to drive the compression unit 140. If the engine has reached a rotation speed below the rotation speed Ns2 in step S190, the motor 130 is stopped in step S200, then the process returns to step S120, where the electromagnetic clutch 120 is connected to cause the engine 10 to drive the compression unit 140 again. When the engine 10 is stopped such as for idling with the thermal load on the refrigeration cycle system 200 lying in a lower load region, the electromagnetic clutch 120 is disconnected to allow the motor 130 to drive the compression unit 140 in order to continue performing the cooling function, in steps S140 and S150.

In accordance with the aforementioned configuration and operation, the operational effects of the present invention are described below. First, when the thermal load on the refrigeration cycle system 200 falls within a predetermined range in the higher load region such as during the cooling-down operation, the primary drive force of the engine 10 is employed to use the compression unit 140 to its fullest capability.

When the passenger compartment has cooled to reduce the thermal load on the refrigeration cycle system 200 to a lower load region than the predetermined range, since less capability is required of the compression unit 140, the motor 130 can be sized to the capability required to drive the compression unit 140 by the motor 130. That is, the motor 130 need not be sized in consideration of the maximum thermal load and thereby can be reduced in size together with the battery 20.

Additionally, the motor 130 drives the compression unit 140 even while the engine 10 is running. This eliminates variations in operation of the compression unit 140 accompanied by variations in the rotation speed of the engine 10, thereby making it possible to provide an improved efficiency to the refrigeration cycle system 200. On the other hand, throughout a year, the thermal load occurs in the lower load region normally with frequencies of 80 to 90%, mainly excluding cooling-down operations during summer. This allows the increase in the efficiency of the refrigeration cycle system 200 to greatly contribute to the improvement in fuel consumption efficiency of the engine 10.

Furthermore, the motor 130 drives the compression unit 140, while the electromagnetic clutch 120 remains disconnected (disengaged), without vibrations caused by the compression unit 140 in operation being propagated to the engine 10 via the belt 50. This makes it possible to improve the environment of the passenger compartment in terms of vibration and noise. When the vehicle engine 10 has stopped, the motor 130 can also serve as a power source as in the prior art to drive the compression unit 140, thereby continuing to perform the cooling function.

In this manner, the power sources for the compression unit 140, that is, the engine 10 and the motor 130, are alternatively used depending on the operating condition of the engine 10 and the thermal load on the refrigeration cycle system 200. This makes it possible to ensure the cooling capability with the motor 130 reduced in size and provide improved fuel consumption efficiency to the vehicle as well, while ensuring the cooling function required when the engine 10 is stopped.

On the other hand, when the motor 130 drives the compression unit 140, the rotation speed of the motor 130 is varied to provide control of the amount of discharge from the compression unit 140. This allows the rotation speed of the motor 130 to vary the amount of discharge from the compression unit 140, and thus eliminates the necessity for the compression unit 140 itself to be provided with a function for varying the discharge volume, thereby making it possible to manufacture the compression unit 140 of a fixed volumetric capacity type at a low cost.

Figure 7:
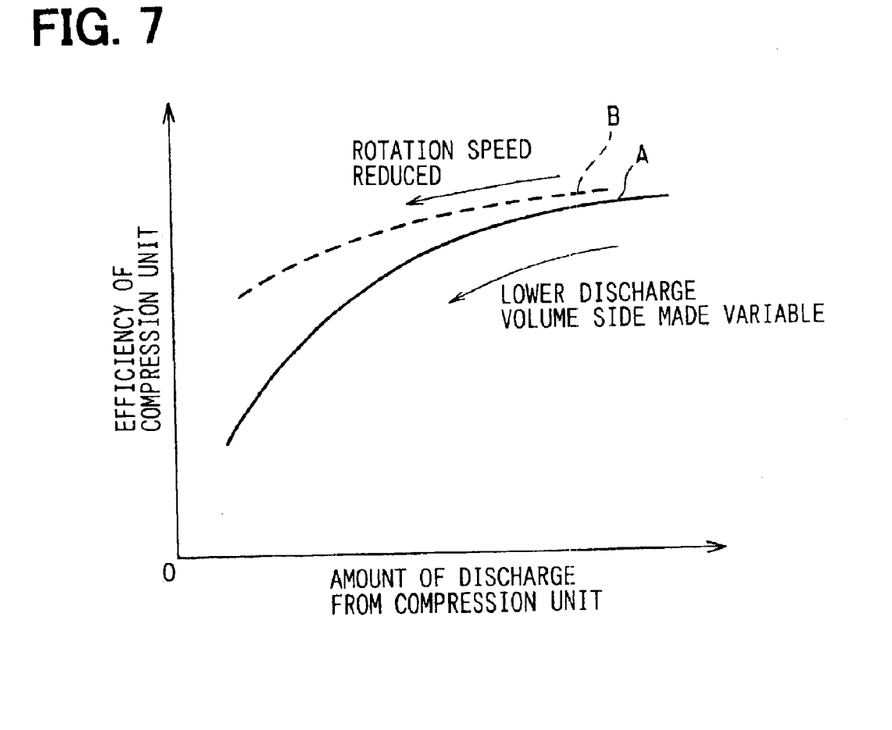
FIG. 7 is a graph showing the efficiency of the compression unit against the amount of discharge from the compression unit.

Unlike those of a variable volumetric capacity type, the compression unit 140 of a fixed volumetric capacity type does not suffer significantly in reduced efficiency during times of a small amount of discharge and thus can always be used with high efficiencies under optimum conditions. This makes it possible to provide improved fuel consumption efficiency to the vehicle. That is, as shown in FIG. 7, when a large compression unit of a variable volumetric capacity type adapted for the maximum thermal load (shown by "A" in the figure) is used with the amount of discharge being varied toward the lower volume region, it causes the compression unit to be used during low load conditions at lower efficiencies of the compression unit. However, a compression unit of a fixed volumetric capacity type that is reduced in size to meet a discharge volume pre-adapted for low load conditions (shown by "B" in FIG. 7) provides a controlled rotation speed and operates at that amount of discharge, thereby making it possible to always provide high efficiencies.

Furthermore, since the electromagnetic clutch 120 is disengaged when the engine rotation speed is greater than or equal to the predetermined rotation speed Ns1, protection can be provided to the compression unit 140. At a lower rotation speed of the engine 10, the compression unit 140 is driven again, ensuring no chance of significantly impairing the performance of the refrigeration cycle system 200. At this time, the motor 130 is also to drive the compression unit 140 while the electromagnetic clutch 120 remains disengaged, thereby making it possible to substantially maintain the performance of the refrigeration cycle system 200.

Figure 8:
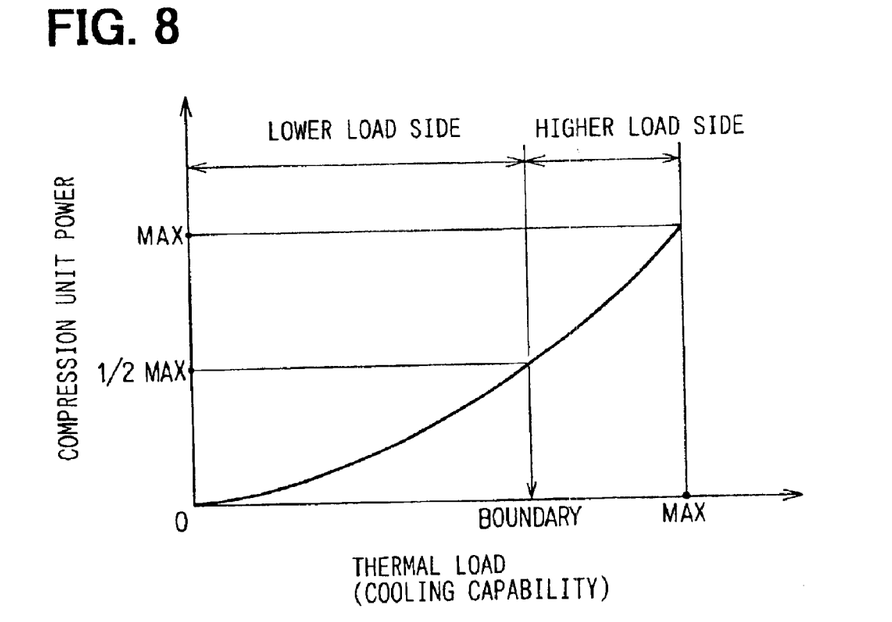
FIG. 8 is a graph showing the concept of determining the boundary region between a high load and a low load of a thermal load.

It is preferable to specifically define the boundary between the higher load region and the lower load region of the thermal load on the refrigeration cycle system 200 as shown in FIG. 8. In other words, as described above, the thermal load region may be defined as such that can be encompassed by half power of the compression unit 140 (MAX) corresponding to the cooling capability required at the maximum thermal load such as at the cooling-down operation.

In general, since the coefficient of performance of the refrigeration cycle system 200 (the ratio of the cooling capability corresponding to a thermal load to the power of the compression unit) decreases as the thermal load increases, the ratio of increase in power required of the compression unit 140 to the thermal load (cooling capability) increases. Conversely, only a slight decrease in thermal load reduces a great deal of power required of the compression unit 140. In this case, since the thermal load corresponding to a power level that is less than or equal to half the maximum power is typically equal to 60 to 70% of the maximum thermal load, which is within the region corresponding to the normal to lower load on the refrigeration cycle system 200, the compression unit 140 can be operated without difficulty.

The motor 130 and the inverter 151 may also be set at the capability that provides the power of the compression unit 140, as the maximum output, required in the boundary region between the higher load region and the lower load region of the thermal load. That is, setting the boundary region of the thermal load as shown in FIG. 8 allows the motor 130 and the inverter 151 to have the capability and size that provide the power, as the maximum output, equal to half the maximum power of the compression unit 140. This allows the motor 130 and the inverter 151 to be provided with a sufficient but minimum capability, while being reduced in size.

The motor 130 may not be limited to a scroll type among those of the fixed volumetric capacity type but may be of a piston or through-vane type. Furthermore, the rotation speed sensor 40 may be provided on the side of the compression unit 140, such that the rotation speed of the compression unit 140 corresponding to the predetermined rotation speed Ns1 is determined to protect the compression unit 140.

(Second Embodiment)

Figure 9:
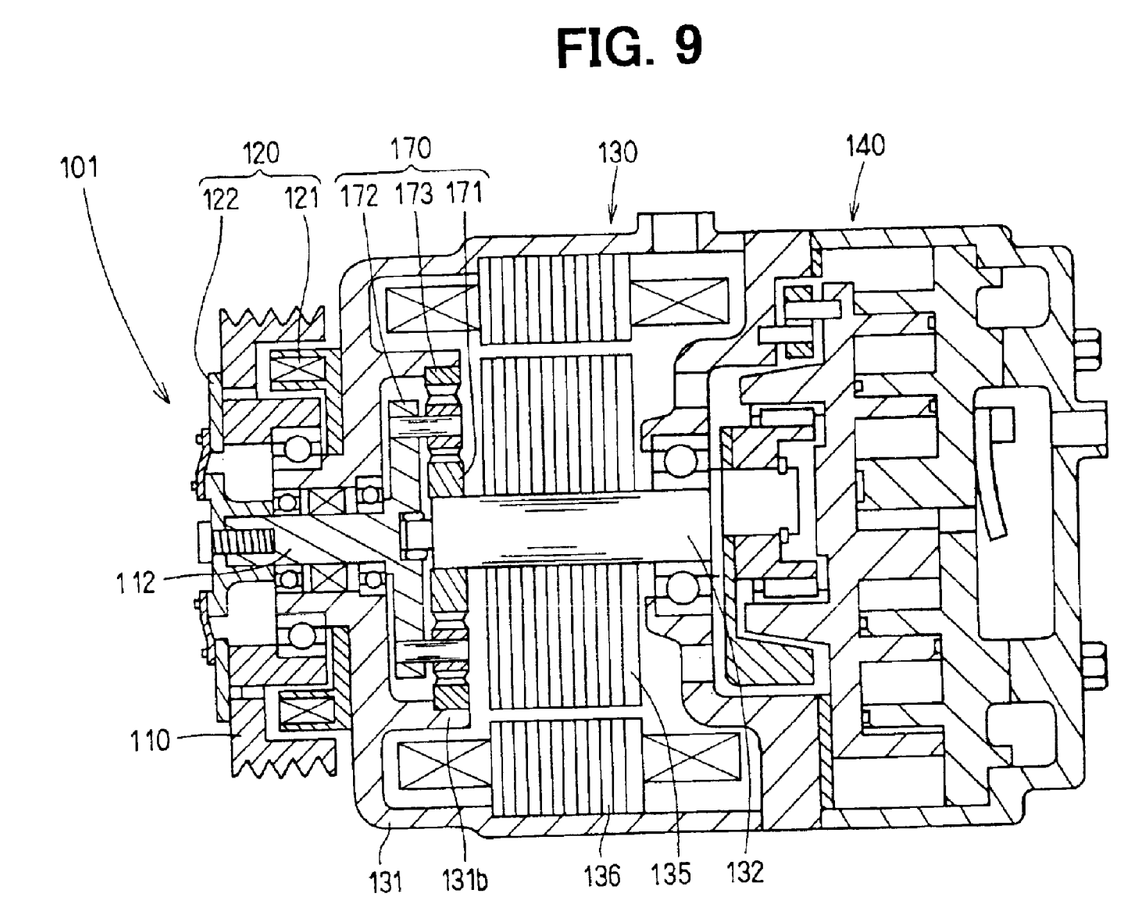
FIG. 9 is a cross-sectional view of a hybrid compressor according to a second embodiment of the present invention.

FIG. 9 shows a second embodiment of the present invention. In the second embodiment, there is provided a gear mechanism as speed increasing means between the pulley 110 and the compression unit 140, more specifically, between the pulley 110 and the motor 130. In this embodiment, the gear mechanism is embodied as a planetary gear 170, of the gears forming the planetary gear 170, a sun gear 171 is coupled to the motor rotating shaft 132 and a planetary gear 172 is coupled to the pulley rotating shaft 112. A ring gear 173 forming the outer circumferential portion of the planetary gear 170 is secured to a projected portion 131b near the bottom of the motor housing 131.

This configuration allows the rotation speed to provide the maximum amount of discharge required to operate the compression unit 140 by the engine 10. This in turn allows the compression unit 140 to provide a smaller discharge volume per one revolution thereof, realizing the compression unit 140 that is reduced in size and manufactured at lower costs. However, the gear mechanism is not limited to the planetary gear 170 but may also employ a combination of ordinary gears for increasing speed.

(Other Embodiments)

Figure 10:
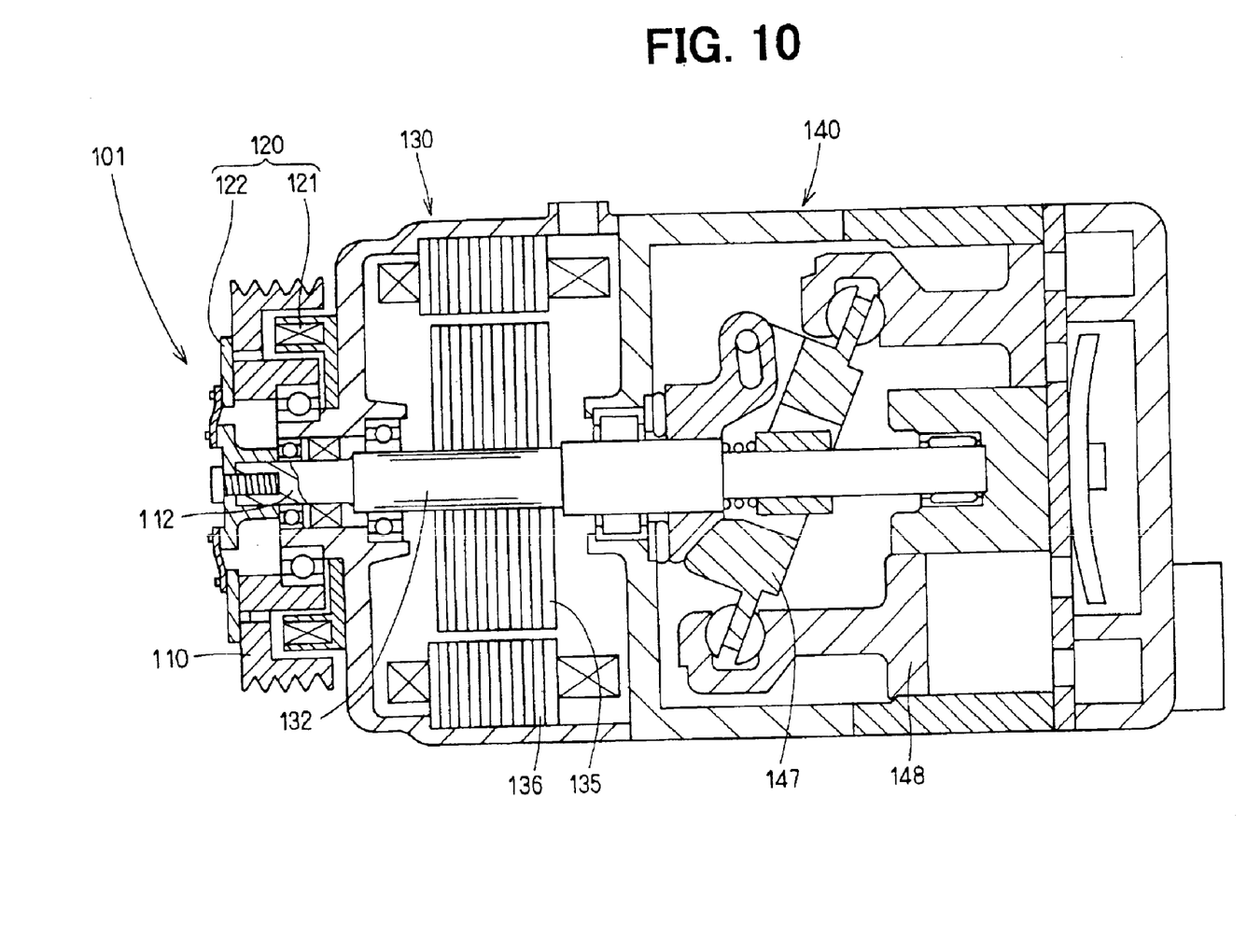
FIG. 10 is a cross-sectional view of a hybrid compressor according to another embodiment of the present invention.

In the first and second embodiments described above, the compression unit 140 has been explained as a compression unit of the fixed volumetric capacity type. However, as shown in FIG. 10, the compression unit 140 may be of a swash-plate variable volumetric capacity type in which the stroke of a piston 148 is varied depending on the tilt angle of a swash plate 147. This may cause degradation in compression unit efficiency but serve to improve the efficiency of the refrigeration cycle system 200. It is also possible to provide a further extended variable range of the amount of discharge to the compression unit 140 when operated by the motor 130.

When the thermal load on the refrigeration cycle system 200 lies in the higher load region, the motor 130 may be started to allow the compression unit 140 to be driven by the engine 10 and the motor 130. This allows the compression unit 140 to be driven by the motor 130 in addition to the engine 10, thereby making it possible to increase the amount of discharge and reduce the size of the compression unit 140 by that amount. The present invention may be applied not only to hybrid vehicles but also to so-called idle-stop vehicles that are adapted to stop the engine 10 when the vehicle is stopped.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hybrid compressor system comprising:
    a fixed displacement compression unit for compressing a refrigerant cycle system,
    a motor powered by a power source to operatively rotate, for driving said compression unit,
    a disconnection means for intermittently disconnecting a drive force of a vehicle engine transmitted to said compression unit, and
    a control means for providing control to operate said motor and to allow said disconnection means to perform disconnection, wherein
    when a thermal load on said refrigeration cycle system lies within a predetermined range in a higher load region said control means connects said disconnection means to allow said vehicle engine to drive said compression unit, and
    when a thermal load on said refrigeration cycle system lies within a lower load region than said predetermined range, said control means disconnects said disconnection means to allow said motor to drive said compression unit even while said vehicle engine is running; and
    the compressor system further includes:
    an external drive means driven by said vehicle engine, provided on a side of said disconnection means closer to said vehicle engine, and
    a speed increasing means for increasing a rotational speed of the compressor by increasing the rotational speed of a drive force transmitted from said vehicle engine, provided between said external drive means and said compression unit but not between said motor and said compression unit,
    wherein said compression unit is increased in speed by said speed increasing means when the compression unit is driven by said vehicle engine,
    said compression unit is in sync with the rotation speed of said motor when the compression unit is driven by said motor,
    and wherein the motor drives the compressor at a higher speed in the higher load region than the speed driven by the motor in the lower region.

2. The hybrid compressor system according to claim 1, wherein
    a boundary between the higher load region and the lower load region of said thermal load is delineated by a thermal load corresponding to a predetermined power level of said compression unit.

3. The hybrid compressor system according to claim 2, wherein
    the cooling capability at a maximum thermal load is capable of cooling a vehicle passenger compartment during normal operation when said vehicle is subjected to sunlight.

4. The hybrid compressor system according to claim 1, wherein
    said control means comprises an inverter for inverting power supplied to operate said motor, and
    said motor and said inverter are set at a capability, as a maximum output, for delivering the power of said compression unit required in the boundary region between the higher load region and the lower load region of said thermal load.

5. The hybrid compressor system according to claim 1, wherein
    said compression unit is a compression unit of a fixed volumetric capacity type having a discharge volume per one revolution set to a predetermined value, and
    to allow said motor to drive said compression unit, said control means varies a rotation speed of said motor to control an amount of discharge from said compression unit.

6. The hybrid compressor system according to claim 1, further comprising:
    a rotation speed sensor means for sensing a rotation speed of said vehicle engine or said compression unit, wherein
    when said compression unit is driven by said vehicle engine and a rotation speed sensed by said rotation speed sensor means is determined to be greater than or equal to a predetermined rotation speed, said control means disconnects said disconnection means, or disconnects said disconnection means to allow said motor to drive said compression unit, and when said rotation speed is below said predetermined rotation speed, said control means connects said disconnection means, or connects said disconnection means to stop said motor.

7. The hybrid compressor system according to claim 6, wherein said disconnection means is an electromagnetic clutch.

8. The hybrid compressor system according to claim 7, wherein when the thermal load on said refrigeration cycle system lies within the predetermined range in the higher load region, said control means connects said disconnection means to allow said vehicle engine and said motor to drive said compression unit.

9. A hybrid compressor system comprising:

a fixed displacement compressor for compressing a refrigerant in a refrigeration circuit;

a motor, which is powered by a power source, to drive the compressor;

a disconnection means for intermittently disconnecting a drive force of a vehicle engine transmitted to said compression unit, and a clutch for selectively connecting and disconnecting a driving force of a vehicle engine to the compressor;

a controller that operates the motor and determines the state of the clutch, wherein:

when the thermal load on the refrigeration circuit lies within a predetermined hi-load region, in which the thermal load is higher than a predetermined level, the controller controls the clutch to allow the vehicle engine to drive the compressor; and when the load on the refrigeration circuit lies within a predetermined low-load region, in which the thermal load is lower than that of the high-load region, the controller controls the clutch to prevent the vehicle engine from driving the compressor and controls the motor to drive the compressor even while the vehicle engine is running; and a pulley driven by the vehicle engine, wherein the pulley is located on an engine side of the clutch, and the pulley transmits-torque from the engine to the compressor;

a speed increasing device located between the pulley and the compressor, but not between the motor and the compressor, wherein the speed increasing device increases the rotational speed of the compressor by increasing the rotational speed of a rotating drive force transmitted from the pulley to the compressor such that the compressor is increased in speed by the speed increasing device when the compressor is driven by the vehicle engine and such that the compressor is synchronized with the rotation speed of the motor when the compressor is driven by the motor, and wherein the motor drives the compressor at a higher speed in the higher load region than the speed driven by the motor in the lower region.

10. The hybrid compressor apparatus according to claim 9, wherein a boundary between the high-load region and the low-load region is delineated by a predetermined power level of the compressor.

11. The hybrid compressor apparatus according to claim 10, wherein the predetermined power level of the compressor corresponds to one-half of the maximum thermal load, and the maximum thermal load corresponds to a cooling capability at which a vehicle passenger compartment is cooled during normal operation when the vehicle is subjected to sunlight.

12. The hybrid compressor apparatus according to claim 10, wherein the controller comprises an inverter for inverting power supplied to the motor, and the maximum output of the motor and the inverter are sufficient to power the compressor in a region of the boundary between the high-load region and the low-load region.

13. The hybrid compressor apparatus according to claim 9, wherein:

the compressor is a compressor of a fixed volumetric capacity, in which the discharge volume per revolution is fixed; and when the motor drives the compressor, the controller varies the rotation speed of the motor to control the discharge volume of the compressor.

14. The hybrid compressor apparatus according to claim 9, further comprising a rotation speed sensor for sensing a rotation speed of the vehicle engine or the compressor, wherein:

when the compressor is driven by the vehicle engine and a rotation speed sensed by the rotation speed sensor is determined to be greater than or equal to a predetermined rotation speed, the controller controls the clutch to prevent the engine from driving the compressor and controls the motor to cause the motor to drive the compressor, and when the rotation speed is below the predetermined rotation speed, the controller stops the motor and controls the clutch to cause the engine to drive the compressor.

15. The hybrid compressor apparatus according to claim 9, wherein, when the thermal load on the refrigeration circuit lies within the high-load region, the controller to cause the motor to drive the compressor such that both the vehicle engine and the motor drive the compressor.

16. The hybrid compressor apparatus according to claim 9, wherein the speed increasing device is a set of gears.

17. The hybrid compressor apparatus according claim 9, wherein the pulley is coaxial with the compressor.

18. The hybrid compressor apparatus according to claim 9, wherein the pulley is driven by a belt, and the belt is driven by the engine.

* * * * *